(12) United States Patent
Fukushima et al.

(10) Patent No.: US 12,121,992 B2
(45) Date of Patent: Oct. 22, 2024

(54) LASER MACHINING METHOD, CONTROLLER, AND ROBOT SYSTEM

(71) Applicant: KABUSHIKI KAISHA YASKAWA DENKI, Kitakyushu (JP)

(72) Inventors: Seiichiro Fukushima, Kitakyushu (JP); Takashi Motoyoshi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 192 days.

(21) Appl. No.: 16/185,364

(22) Filed: Nov. 9, 2018

(65) Prior Publication Data

US 2019/0143448 A1    May 16, 2019

(30) Foreign Application Priority Data

Nov. 13, 2017   (JP) ................ 2017-218509

(51) Int. Cl.
| | | |
|---|---|---|
| B23K 26/08 | (2014.01) | |
| B23K 26/04 | (2014.01) | |
| B23K 26/046 | (2014.01) | |
| B23K 26/073 | (2006.01) | |
| B23K 26/082 | (2014.01) | |
| B25J 9/16 | (2006.01) | |

(52) U.S. Cl.
CPC ........ *B23K 26/0884* (2013.01); *B23K 26/043* (2013.01); *B23K 26/046* (2013.01); *B23K 26/0736* (2013.01); *B23K 26/082* (2015.10); *B25J 9/1679* (2013.01)

(58) Field of Classification Search
CPC .... B23K 26/04; B23K 26/042; B23K 26/044; B23K 26/046; B23K 26/048; B23K 26/06; B23K 26/062; B23K 26/0622; B23K 26/0626; B23K 26/073; B23K 26/0732; B23K 26/0734; B23K 26/0736; B23K 26/082; B23K 26/0884; B25J 9/1679
USPC .......................... 219/121.6–121.83
See application file for complete search history.

(56) References Cited

U.S. PATENT DOCUMENTS

| | | | |
|---|---|---|---|
| 5,302,802 A | 4/1994 | Fujinaga et al. | |
| 5,624,585 A * | 4/1997 | Haruta | B23K 26/26 |
| | | | 219/121.63 |

(Continued)

FOREIGN PATENT DOCUMENTS

| | | |
|---|---|---|
| DE | 10 2011 116 833 A1 | 6/2012 |
| JP | 4-220190 A | 8/1992 |
| JP | 2015-150655 A | 8/2015 |

OTHER PUBLICATIONS

Combined Chinese Office Action and Search Report issued May 20, 2020 in Chinese Patent Application No. 201811002970.X (with English translation), 15 pages.

(Continued)

*Primary Examiner* — Sang Y Paik
(74) *Attorney, Agent, or Firm* — Oblon, McClelland, Maier & Neustadt, L.L.P.

(57) ABSTRACT

A laser machining method includes obtaining a movement direction in which a head that variably makes a shape of a radiation locus using a laser is being moved by a robot that causes the head to move along a machining line, and adjusting the radiation locus made by the head to keep a constant relative angle between the movement direction obtained by the obtaining and a representative angle of the shape of the radiation locus.

20 Claims, 7 Drawing Sheets

(56) References Cited

U.S. PATENT DOCUMENTS

| | | | | |
|---|---|---|---|---|
| 5,911,890 A * | 6/1999 | Dulaney | ............ | B23K 26/0648 |
| | | | | 219/121.85 |
| 2004/0206735 A1 * | 10/2004 | Okuda | ............... | B23K 26/0884 |
| | | | | 219/121.78 |
| 2005/0205538 A1 * | 9/2005 | Li | ......................... | B82Y 30/00 |
| | | | | 219/121.73 |
| 2007/0199929 A1 | 8/2007 | Rippi et al. | | |
| 2012/0255937 A1 | 10/2012 | Oe et al. | | |
| 2012/0255938 A1 * | 10/2012 | Oe | ....................... | B23K 26/082 |
| | | | | 219/124.22 |
| 2016/0354867 A1 * | 12/2016 | Matsuoka | .......... | B23K 26/0876 |
| 2017/0225268 A1 | 8/2017 | Akahoshi et al. | | |

OTHER PUBLICATIONS

Extended European Search Report issued on Apr. 18, 2019 in Patent Application No. 18205603.6, 8 pages.
Japanese Office Action issued on Jan. 7, 2020 in Patent Application No. 2017-218509 (with English translation), 7 pages.
Communication issued Apr. 28, 2021 in corresponding European Patent Application No. EP18205603.6, filed Nov. 12, 2018.

\* cited by examiner

LASER MACHINING METHOD, CONTROLLER, AND ROBOT SYSTEM

CROSS-REFERENCE TO RELATED APPLICATIONS

The present application claims priority under 35 U.S.C. § 119 to Japanese Patent Application No. 2017-218509, filed Nov. 13, 2017. The contents of this application are incorporated herein by reference in their entirety.

BACKGROUND

Field of the Invention

The embodiments disclosed herein relate to a laser machining method, a controller, and a robot system.

Discussion of the Background

Some robots known in the art make a motion by driving a plurality of joints. Such robot includes an end effector mounted at the leading end of the robot. The end effector varies depending on the application in which the robot is used, such as machining and welding, so that the robot is capable of performing various kinds of work such as machining and welding a workpiece.

JP 2015-150655A discloses, as an end effector, a laser machining head capable of being taught a shape of a radiation locus.

SUMMARY

According to one aspect of the present invention, a laser machining method includes obtaining a movement direction in which a head that variably makes a shape of a radiation locus using a laser is being moved by a robot that causes the head to move along a machining line, and adjusting the radiation locus made by the head to keep a constant relative angle between the movement direction obtained by the obtaining and a representative angle of the shape of the radiation locus.

According to another aspect of the present invention, an apparatus includes control circuitry that controls a motion of a head that variably makes a shape of a radiation locus using a laser. The control circuitry obtains a movement direction in which the head is being moved by a robot along a machining line, and adjusts the radiation locus made by the head to keep a constant relative angle between the obtained movement direction and a representative angle of the shape of the radiation locus According to the other aspect of the present invention, a robot system includes a head that variably makes a shape of a radiation locus using a laser, a robot that causes the head to move along a machining line, and control circuitry that controls a motion of the head. The control circuitry obtains a movement direction in which the head is being moved by the robot along the machining line, and adjusts the radiation locus made by the head to keep a constant relative angle between the obtained movement direction and a representative angle of the shape of the radiation locus.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, laser machining method and robot system according to embodiments of the present disclosure will be described in detail below. It is noted that the following embodiments are provided for example purposes only and are not intended for limiting purposes. Also, while in the following description laser welding is taken as an example of laser machining, it is also possible to change the roughness of a workpiece, form a groove on a workpiece, or draw a picture on a workpiece.

Also in the following description, terms such as "constant", "orthogonal", "perpendicular", and "parallel" may not necessarily be used in a strict sense. That is, these terms are used with production-related and installation-related tolerances and errors taken into consideration.

Figure 1:
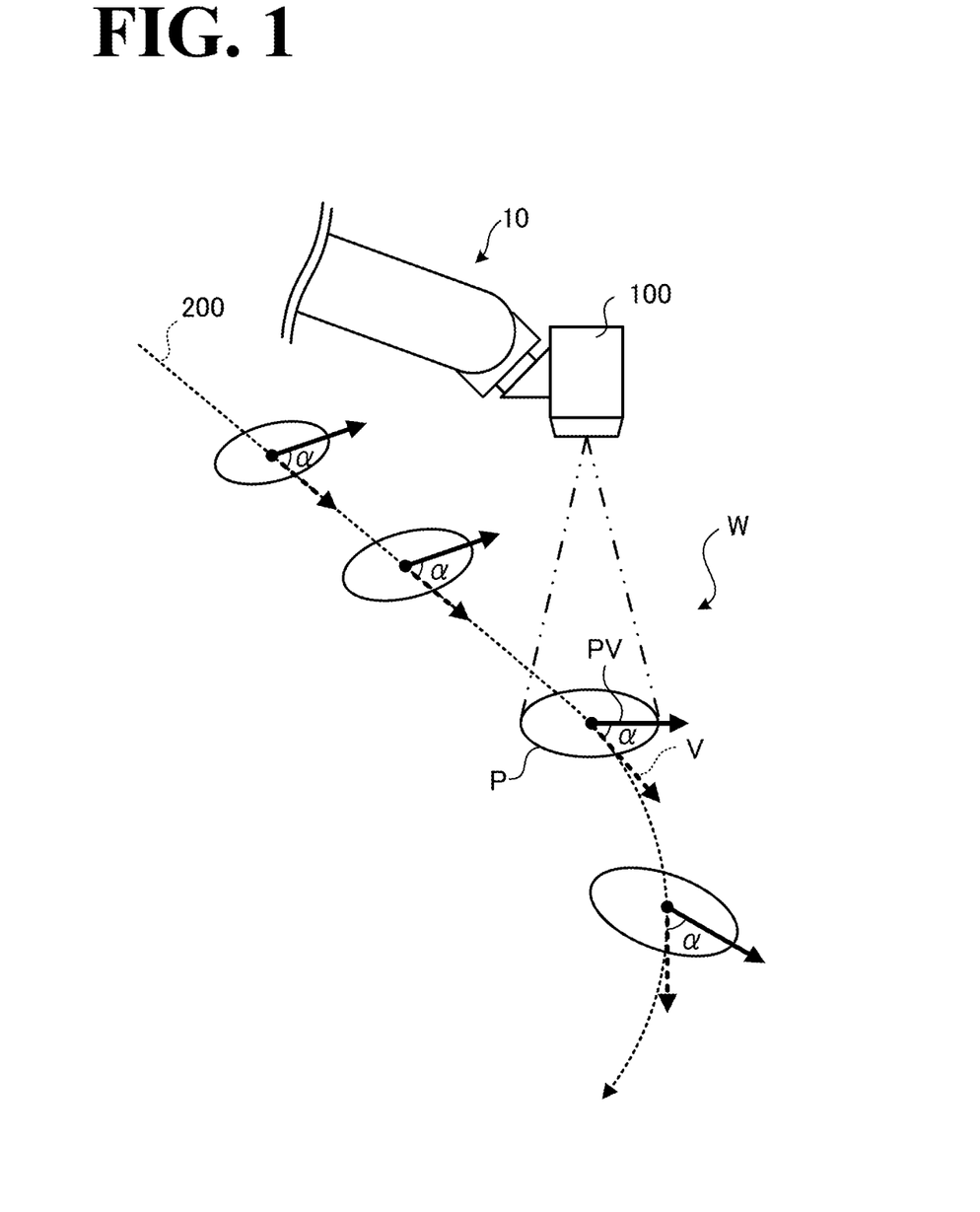
FIG. 1 illustrates an outline of a laser machining method according to an embodiment.

A laser machining method according to this embodiment will be outlined by referring to FIG. 1. FIG. 1 illustrates an outline of the laser machining method according to this embodiment. As illustrated in FIG. 1, a head 100, which performs laser machining, is mounted on the leading end of a robot 10.

As illustrated in FIG. 1, the robot 10 moves the head 100 along a machining line 200. The machining line 200 is set on the workpiece W. As used herein, the machining line 200 refers to an imaginary line set along the extending direction of a machining area of the workpiece W. The head 100 includes a unit of mechanism such as a mirror galvanometer for changing the direction of laser radiation. Specifically, two mirrors swingable about different axes are independently driven to change the direction of laser radiation in a desired manner.

That is, the head 100 is capable of causing the two mirrors to cooperate with each other to make any desired shape of a radiation locus P. The head 100 is also capable of changing a representative direction PV in which the shape of the radiation locus P is pointed.

As illustrated in FIG. 1, the radiation locus P has an ellipse shape, and the representative direction PV is parallel to the longitudinal axis of the ellipse shape. Also in FIG. 1, movement directions V of the radiation locus P and the head 100 are illustrated at predetermined spatial intervals. It is to be that while the radiation locus P forms a spiral shape in actual situations of the movement of the head 100 along the machining line 200, the radiation locus P is illustrated in the shape of an ellipse for simplicity of description.

As illustrated in FIG. 1, when the movement direction, V, of the head 100 moving along the machining line 200 changes, a conventional result is that the relative angle of the representative direction PV relative to the movement direction V changes. This can cause a varied machining width over which the workpiece W is machined, resulting in degraded machining quality.

In light of the circumstances, the laser machining method according to this embodiment includes adjusting the shape of the radiation locus P to keep a constant relative angle between the representative direction PV of the radiation locus P and the movement direction V of the head 100 moving along the machining line 200.

Specifically, even though the head 100 moves along the machining line 200 while maintaining a constant posture relative to the workpiece W, the head 100 changes the direction in which the shape of the radiation locus P is pointed to keep a constant relative angle of a between the movement direction V and the representative direction PV.

With this configuration, the laser machining method according to this embodiment eliminates or minimizes degradation of machining quality even when the machining line 200 is curved, that is, even when the direction of the machining line 200 changes. That is, the laser machining method according to this embodiment maintains laser machining quality.

Also, the laser machining method according to this embodiment prioritizes the motion of the head 100 to change the representative direction PV of the radiation locus P over the motion of the robot 10 to change the posture of the head 100. This eliminates or minimizes vibration in the robot 10 involved with the change of the posture of the head 100, resulting in increased machining accuracy.

Figure 2:
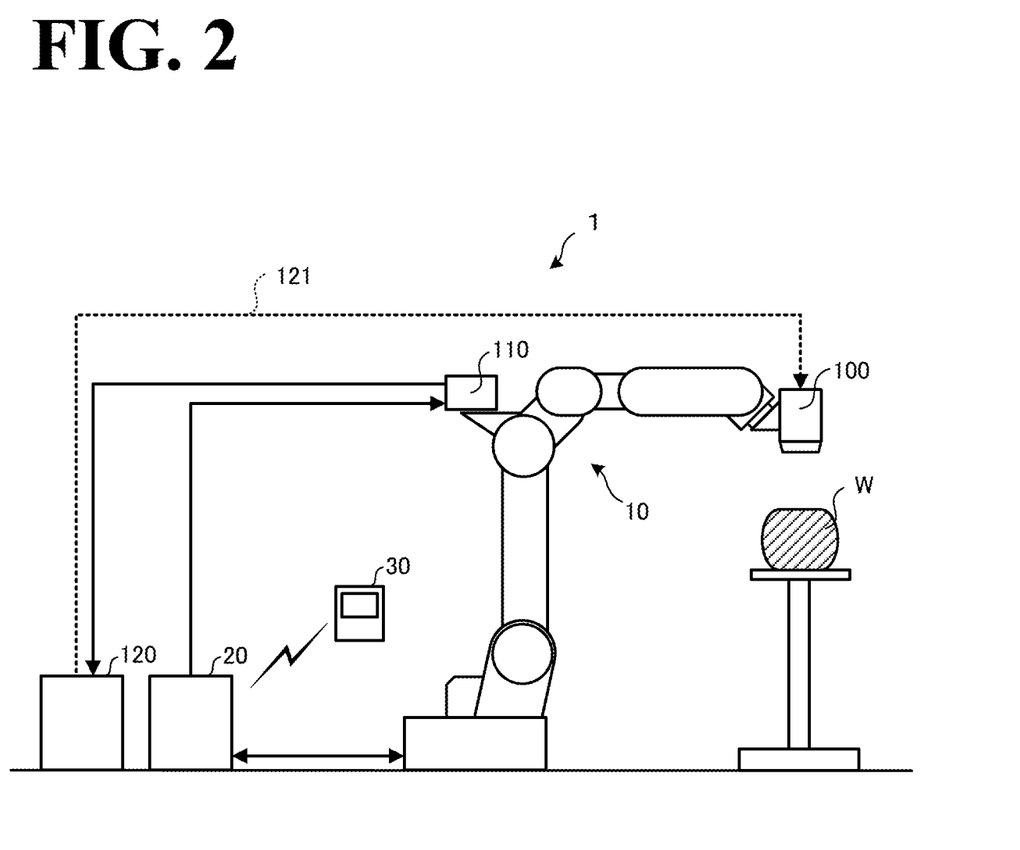
FIG. 2 illustrates how elements of a robot system are connected to each other.

The laser machining method described above by referring to FIG. 1 can be performed by a robot system 1. By referring to FIG. 2, description will be made with regard to how the elements of the robot system 1 are connected to each other. FIG. 2 illustrates how the elements of the robot system 1 are connected to each other. As illustrated in FIG. 2, the robot system 1 includes the robot 10, a robot controller 20, a terminal device 30, the head 100, a head controller 110, and a laser oscillator 120.

It is to be noted that FIG. 2 also illustrates the workpiece W, which is an object machined by the robot system 1. It is also to be noted in the following description that a reference to "the controller" indicates the head controller 110, instead of the robot controller 20.

In this embodiment, the robot 10 is a six-axis vertical multi-articular robot with the head 100 mounted on the leading end of the robot. The robot controller 20 controls motions of the robot 10. Through the robot controller 20, the terminal device 30 transmits setting values or other parameters for the head 100 to the head controller 110 in a wired or wireless manner.

The head controller 110 controls motions of the head 100 based on setting values for the head 100 received through the robot controller 20. The head controller 110 also makes instructions such as a laser intensity instruction to the laser oscillator 120.

Upon receipt of an instruction from the head controller 110, the laser oscillator 120 transmits laser to the head 100 through an optical fiber 121. The elements of the robot system 1 will be described in detail later by referring to FIG. 4.

While in FIG. 2 the head controller 110 and the robot controller 20 are separate structures, the robot controller 20 may incorporate therein the functions of the head controller 110.

Figure 3:
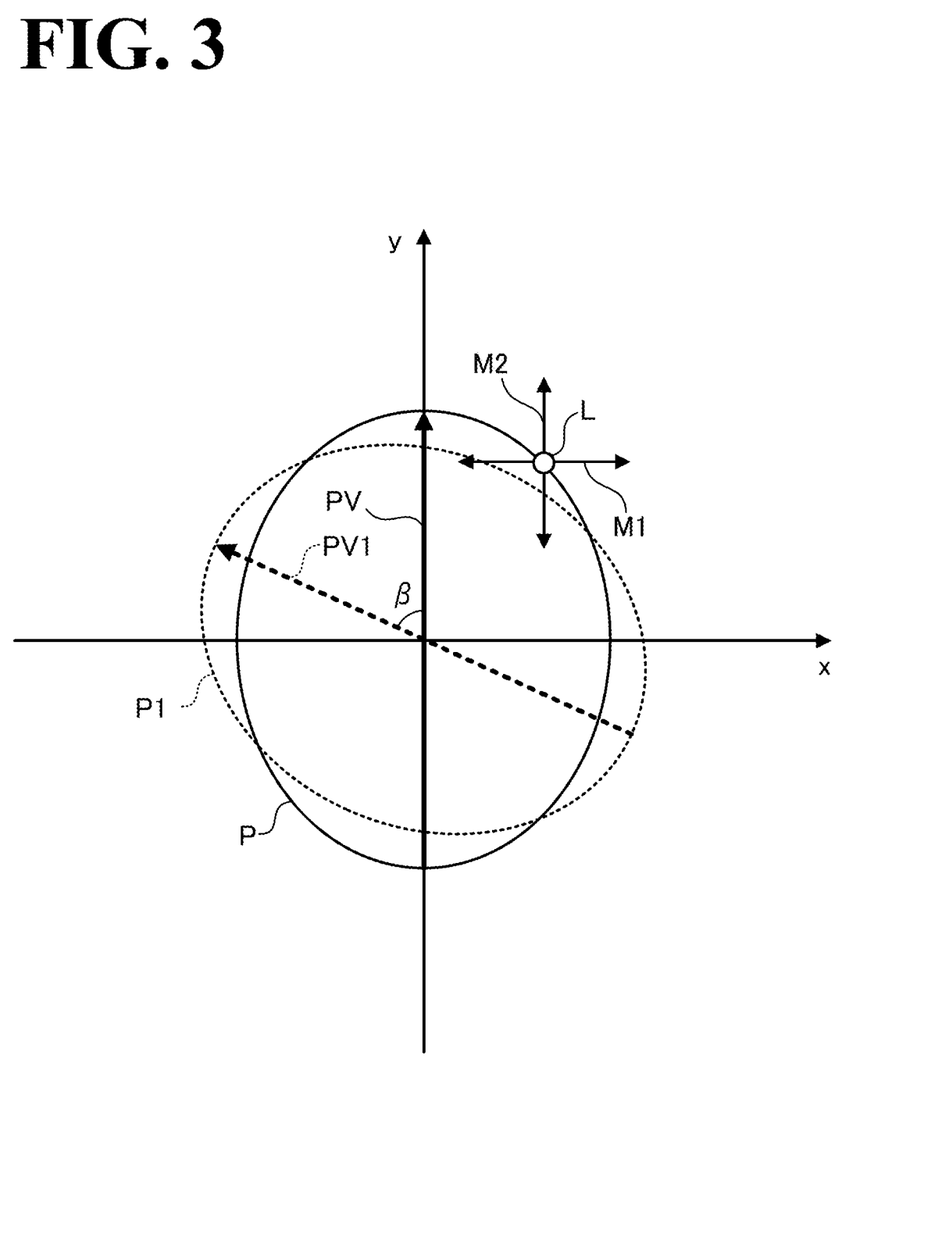
FIG. 3 illustrates how a head makes a motion.

By referring to FIG. 3, how the head 100 (see FIG. 1) makes a motion will be described. FIG. 3 illustrates how the head 100 makes a motion. Specifically, FIG. 3 illustrates an xy coordinate system fixed to the head 100.

FIG. 3 also illustrates a laser radiation point L with swing direction M1 and swing direction M2 of a pair of swingable mirrors. In FIG. 3, the swing direction M1 and the swing direction M2 are orthogonal to each other, the x axis and the swing direction M1 are parallel to each other, and the y axis and the swing direction M2 are parallel to each other.

As illustrated in FIG. 3, the head 100 moves the laser radiation point L in the swing direction M1 and the swing direction M2. By combining the motion in the swing direction M1 and the motion in the swing direction M2, the locus of motion of the radiation point L, that is, the radiation locus P can have any shape.

In the embodiment of FIG. 3, the radiation locus P has an ellipse shape, similarly to the radiation locus P illustrated in FIG. 1, and the representative direction PV of the radiation locus P is parallel to the longitudinal axis of the ellipse shape. Also in FIG. 3, the representative direction PV matches the y axis. The head 100 adjusts the displacement in the swing direction M1 and the displacement in the swing direction M2 in a desired manner to turn the radiation locus P by a desired angle while maintaining the shape of the radiation locus P.

In the embodiment of FIG. 3, the radiation locus P is turned counter-clockwise by an angle of β, resulting in a radiation locus P1 as indicated by a broken line. Also as illustrated in FIG. 3, the representative direction PV of the radiation locus P is turned by an angle of β, resulting in a representative direction PV1 as indicated by a broken line arrow. By changing the angle β to a desired angle, the head 100 is able to turn the radiation locus P and the representative direction PV by a desired angle.

That is, by turning the radiation locus P by a desired angle, the head 100 is able to change the representative direction PV of the radiation locus P by a desired angle without changing the posture of the head 100.

While in FIG. 3 the shape of the radiation locus P is an ellipse, the head 100 is capable of making any other various shapes than an ellipse for the radiation locus P. This will be described later by referring to FIGS. 6A and 6B.

Figure 4:
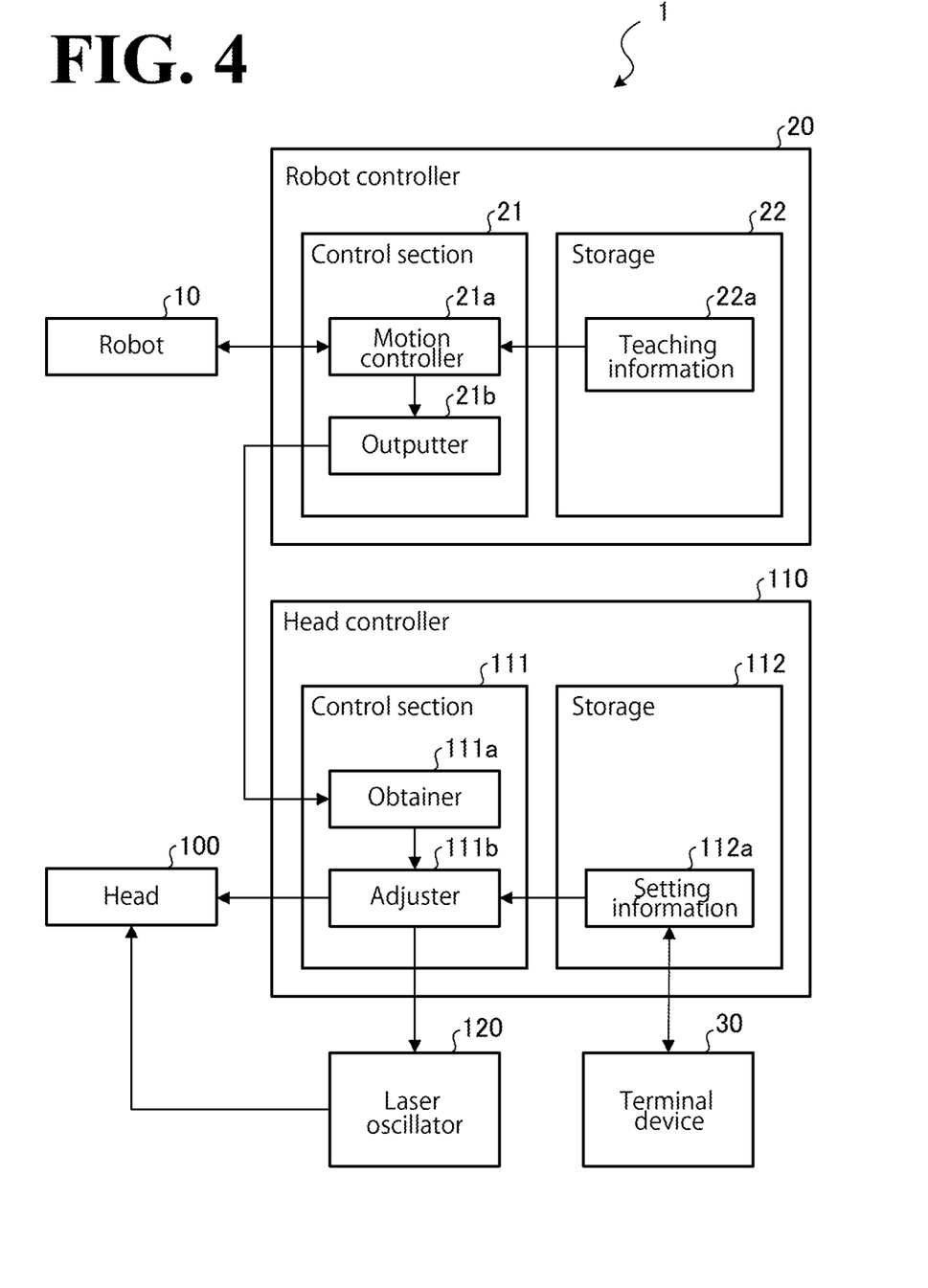
FIG. 4 is a block diagram illustrating a configuration of the robot system.

Now that how the elements of the robot system 1 are connected each other has been described by referring to FIG. 2, a configuration of the robot system 1 will be described in more detail below by referring to FIG. 4. FIG. 4 is a block diagram illustrating a configuration of the robot system 1. As illustrated in FIG. 4, the robot system 1 includes the robot 10, the robot controller 20, the terminal device 30, the head 100, the head controller 110, and the laser oscillator 120.

For simplicity of description, the terminal device 30 directly communicates with the head controller 110 in FIG. 4. In another possible embodiment, the terminal device 30 may indirectly communicate with the head controller 110 through the robot controller 20. Also, the following description is mainly regarding a configuration of the robot controller 20 and a configuration of the head controller 110.

A configuration of the robot controller 20 will be described first. The robot controller 20 is connected to the robot 10 and the head controller 110. The robot controller 20 controls motions of the robot 10 and transmits to the head controller 110 information used in motion control of the head 100.

Specifically, the robot controller 20 includes a control section 21 and a storage 22. The control section 21 includes a motion controller 21a and an outputter 21b. The storage 22 stores teaching information 22a. The robot controller 20 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the motion controller 21a and the outputter 21b of the control section 21. At least one or all of the motion controller 21a and the outputter 21b may be implemented by hardware such as ASIC (Application Specific Integrated Circuit) and FPGA (Field Programmable Gate Array).

The storage 22 corresponds to the RAM and/or the HDD. The RAM and the HDD are capable of storing the teaching information 22a. It will be understood by those skilled in the art that the robot controller 20 may obtain the above-described programs and various kinds of information from another computer connected to the robot controller 20 through a wired or wireless network or from a portable recording medium.

Based on the teaching information 22a, the motion controller 21a controls the robot 10 to make a motion. The teaching information 22a is prepared in the teaching stage, in which the robot 10 is taught a motion, and includes "jobs" that constitute a program defining a motion path of the robot 10.

When the motion of the robot 10 to change the posture of the head 100 and the motion of the head 100 to change the representative direction PV of the radiation locus P are available, the robot system 1 prioritizes the motion of the head 100.

That is, when securing a constant relative angle between the representative direction PV and the movement direction V of the radiation locus P is viable by causing the head 100 to make a motion, the teaching information 22a includes a content specifying that the robot 10 does not change the posture of the head 100.

The motion controller 21a calculates the movement direction V of the head 100 mounted on the robot 10 and calculates the posture of the head 100. In such an application that the movement direction V of the head 100 is represented using a coordinate system fixed to the head 100, the calculation of the posture of the head 100 may be omitted. The motion controller 21a performs feedback control using an encoder value from an actuator such as a motor that provides motive power to the robot 10. In this manner, the motion controller 21a improves the motion accuracy of the robot 10.

After the motion controller 21a has calculated the movement direction V of the head 100 and the posture of the head 100, the outputter 21b outputs the movement direction V and the posture of the head 100 to the head controller 110. When the motion controller 21a causes the robot 10 to make a motion to keep a constant posture of the head 100 relative to the workpiece W (see FIG. 1), the outputter 21b may omit the output of the posture of the head 100. The outputter 21b may also omit the output of the posture of the head 100 when the movement direction V of the head 100 is represented on a coordinate system fixed to the head 100.

A configuration of the head controller 110 will be described. The head controller 110 is connected to the head 100, the laser oscillator 120, and the terminal device 30.

From the terminal device 30, the head controller 110 receives the radiation locus P made by the head 100, the representative direction PV of the radiation locus P, and setting information 112a, which is associated with laser intensity. The head controller 110 may be similar to the robot controller 20 in hardware configuration and software configuration.

From the robot controller 20, the head controller 110 receives the movement direction V of the head 100 and the posture of the head 100. Then, the head controller 110 controls motions of the head 100 based on the setting information 112a and other information received from the terminal device 30 and the robot controller 20.

Specifically, the head controller 110 includes a control section 111 and a storage 112. The control section 111 includes an obtainer 111a and an adjuster 111b. The storage 112 stores the setting information 112a.

From the robot controller 20, the obtainer 111a receives the movement direction V of the head 100 and the posture of the head 100. Then, the obtainer 111a forwards the received information to the adjuster 111b.

The adjuster 111b controls motions of the head 100 based on: the movement direction V of the head 100 and the posture of the head 100 received from the obtainer 111a; and the setting information 112a.

Specifically, in the case where the robot controller 20 is controlling the robot 10 to make a motion to keep a constant posture of the head 100 relative to the workpiece W, the adjuster 111b adjusts the motion of the head 100 based on the movement direction V of the head 100 received from the robot controller 20. By adjusting the motion of the head 100 in this manner, the adjuster 111b makes a constant angle of a (see FIG. 1) between the movement direction V of the head 100 and the representative direction PV of the radiation locus P.

In the case where the robot controller 20 is not controlling the robot 10 to make a motion to keep a constant posture of the head 100 relative to the workpiece W, the adjuster 111b adjusts the motion of the head 100 based on the posture of the head 100 and the movement direction V of the head 100 received from the robot controller 20. By adjusting the motion of the head 100 in this manner, the adjuster 111b makes a constant angle of a (see FIG. 1) between the movement direction V of the head 100 and the representative direction PV of the radiation locus P.

When, as described above, the movement direction V of the head 100 is represented on a coordinate system fixed to the head 100, the adjuster 111b may adjust the motion of the head 100 to keep a constant angle of a (see FIG. 1) between the movement direction V and the representative direction PV of the radiation locus P. That is, the adjuster 111b is able to adjust the motion of the head 100 without using the posture of the head 100.

Based on the setting information 112a, the adjuster 111b transmits to the laser oscillator 120 a change instruction for change of laser intensity or similar parameter. The laser oscillator 120 provides the head 100 with a level of laser corresponding to the change instruction from the adjuster 111b.

The terminal device 30 is a computer that includes an input-output device, such as a touch panel display, and a wired or wireless communication device. The terminal device 30 displays a content of the setting information 112a and an input-output screen on which the content can be corrected or changed and on which new information can be input.

Figure 5:
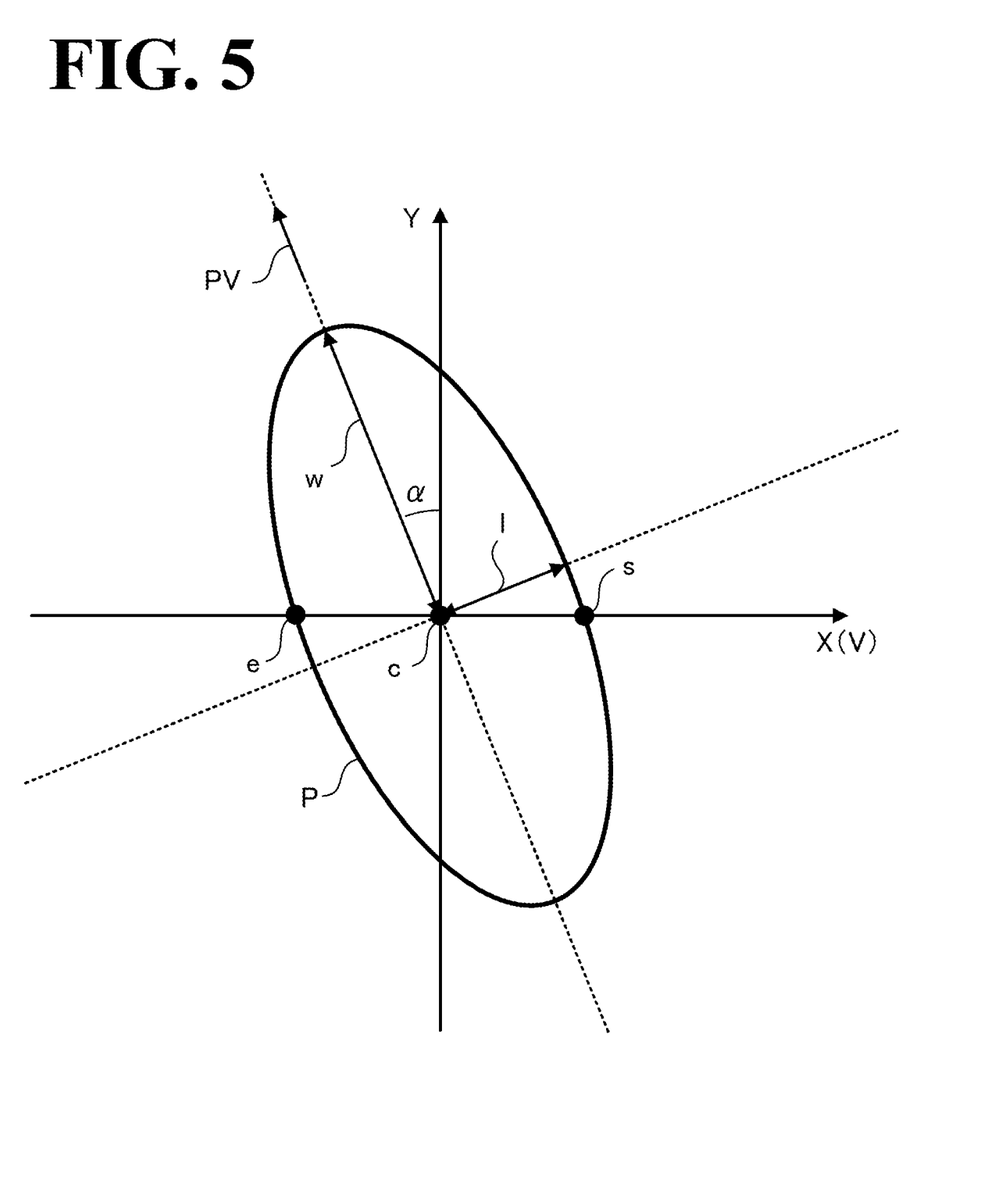
FIG. 5 illustrates setting items of the head.

By referring to FIG. 5, description will be made with regard to the head 100's setting items included in the setting information 112a illustrated in FIG. 4. FIG. 5 illustrates setting items of the head 100. Specifically, FIG. 5 illustrates an XY coordinate system with the X axis matching the movement direction V. The XY coordinate system is a coordinate system that is based on the workpiece W, as opposed to the xy coordinate system illustrated in FIG. 3

(coordinate system fixed to the head 100). The robot system 1 may perform control using both an xy coordinate system, with the x axis and the y axis, and an XY coordinate system, with the X axis and the Y axis. In this case, the xy coordinate system and the XY coordinate system are the same coordinate systems.

As illustrated in FIG. 5, the head 100's setting items include starting phases, ending phase e, center c, welding width w, progression length 1, inclination angle α, and specified shape. Based on these setting items, the radiation locus P and its representative direction PV illustrated in FIG. 5 are determined uniquely. In the embodiment of FIG. 5, the specified shape is an ellipse shape.

For example, the starting phase s is a counter-clockwise angle relative to the X axis. In the embodiment of FIG. 5, the starting phase s is 0° (degrees). The ending phase e is a counter-clockwise angle relative to the X axis. In the embodiment of FIG. 5, the ending phase e is 180° (degrees).

The starting phase s corresponds to the angle at which laser radiation starts, and the ending phase e corresponds to the angle at which laser radiation stops. The center c corresponds to the center of the shape of the radiation locus P. The welding width w corresponds to the width of the shape in the representative direction PV. The progression length l corresponds to the width of the shape in a direction perpendicular to the representative direction PV.

The inclination angle α corresponds to the angle α illustrated in FIG. 1. It is also possible to use the turning direction of the radiation locus P as an additional setting item. In this case, a choice can be made as to whether the radiation locus P turns clockwise or counter-clockwise.

The setting items illustrated in FIG. 5 (the starting phase s, the ending phase e, the center c, the wielding width w, the progression length l, and the inclination angle α) may be input through the terminal device 30 illustrated in FIG. 4. While in FIG. 5 the shape of the radiation locus P is an ellipse, the head 100 is capable of making any other various shapes than an ellipse for the radiation locus P. By referring to FIGS. 6A and 6B, variations of the shape of the radiation locus P will be described below.

Figure 6A:
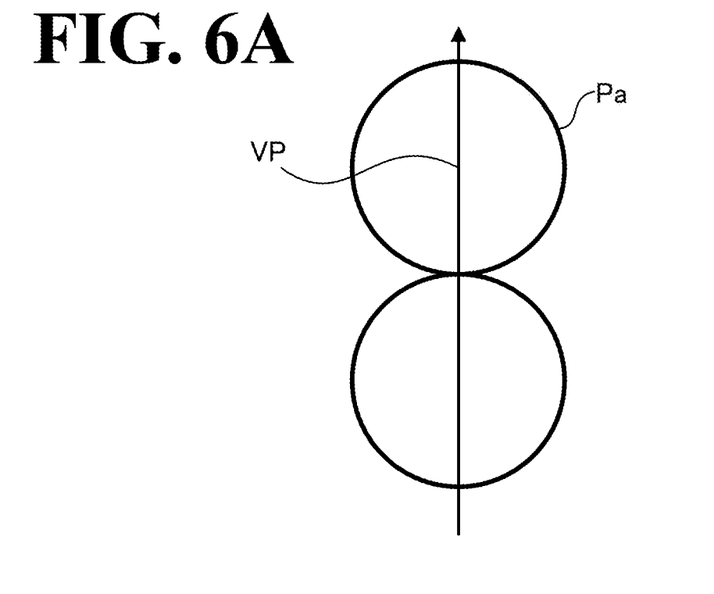
FIG. 6A illustrates a first variation shape of a radiation locus.
Figure 6B:
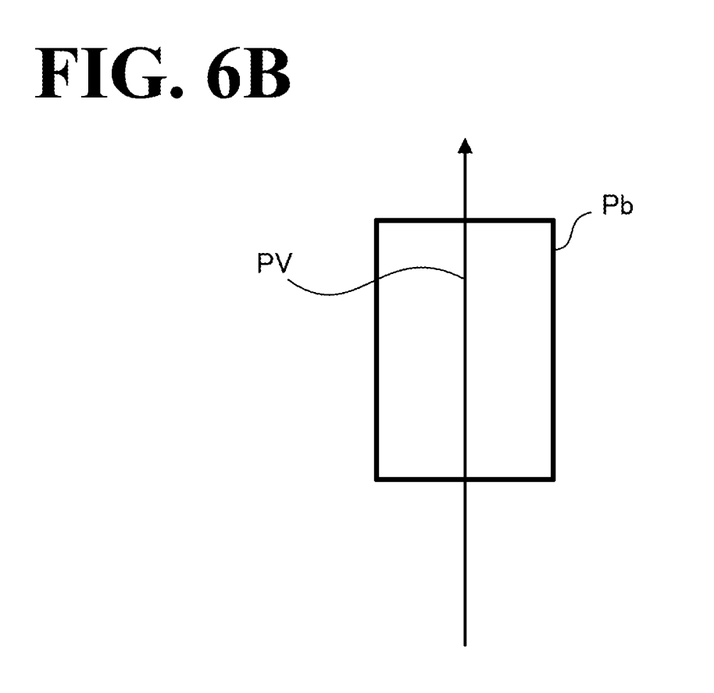
FIG. 6B illustrates a second variation shape of a radiation locus.

FIGS. 6A and 6B respectively illustrate a first variation and a second variation of the shape of the radiation locus P. Specifically, FIG. 6A illustrates a figure-of-eight shape, and FIG. 6B illustrates a rectangular shape.

As illustrated in FIG. 6A, the head 100 is capable of making, as radiation locus Pa, a shape of two circles connected together. In this case, the shape may have a representative angle VP parallel to the longitudinal axis of the radiation locus Pa. The representative angle VP may also be parallel to the shorter axis of the radiation locus Pa, or may be different from the longitudinal axis or the shorter axis by a predetermined angle.

As illustrated in FIG. 6B, the head 100 is capable of making, as radiation locus Pb, a rectangular shape. The representative direction PV may be parallel to the longitudinal sides of the radiation locus Pb. The representative angle VP may also be parallel to shorter sides of the radiation locus Pb, or may be different from the longitudinal sides or the shorter sides by a predetermined angle.

While variations of the shape of the radiation locus P have been described by referring to FIGS. 6A and 6B, these variations are not intended as limiting the shape of the radiation locus P. For example, the shape of the radiation locus P may be a triangle or a linear shape. That is, the shape of the radiation locus P may be any shape that can be drawn unicursally. In the case of a linear shape, the laser radiation point L (see FIG. 3) makes a reciprocating motion between one end and the other end of the linear shape.

Figure 7:
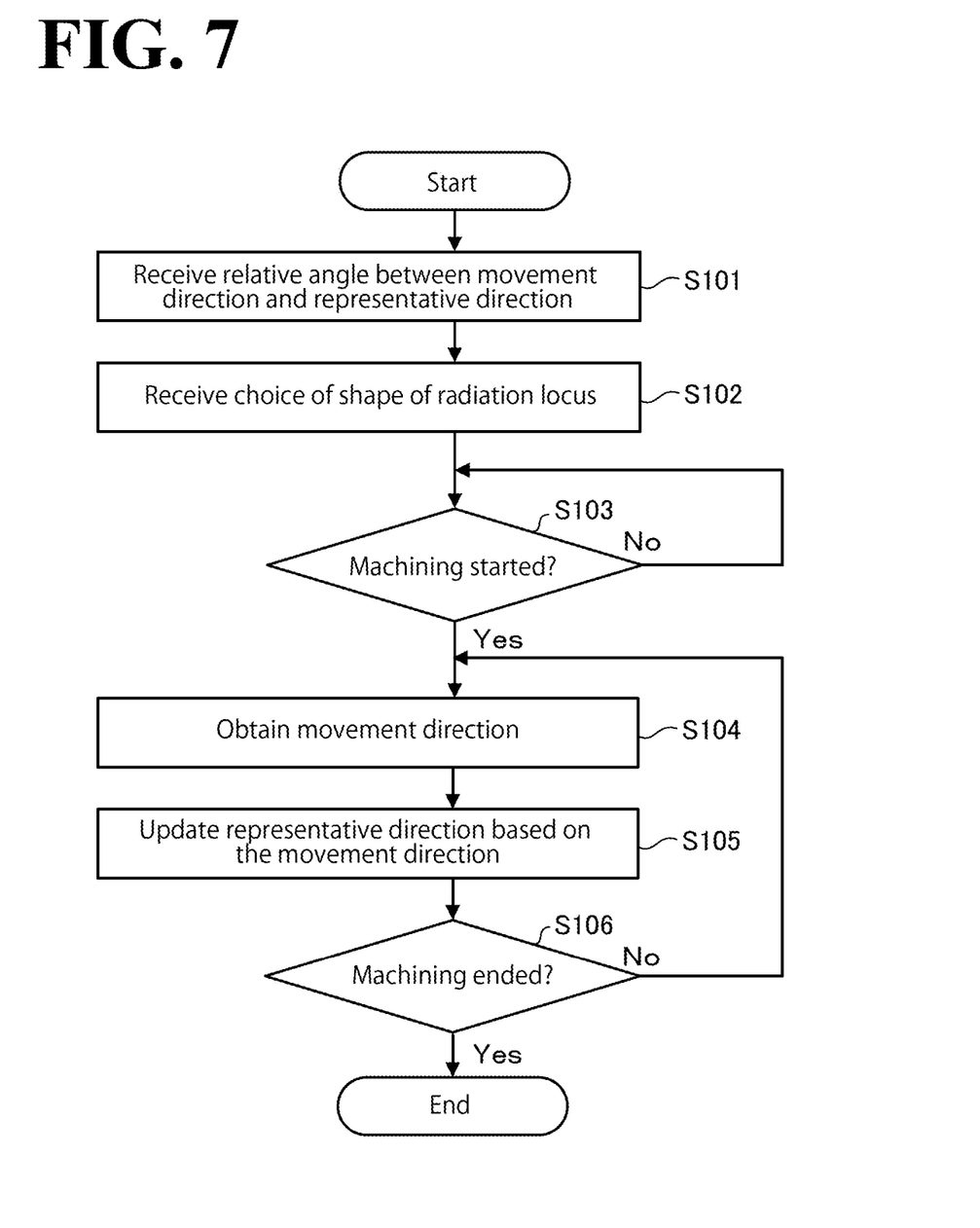
FIG. 7 is a flowchart of a procedure for processing performed by the robot system.

By referring to FIG. 7, a procedure for processing performed by the robot system 1 will be described. FIG. 7 is a flowchart of a procedure for processing performed by the robot system 1. As illustrated in FIG. 7, the head controller 110 receives, through the terminal device 30, a setting of the relative angle between the movement direction V and the representative direction PV (step S101).

The head controller 110 also receives, through the terminal device 30, a choice of the shape of the radiation locus P (step S102). The contents received at steps S101 and S102 are reflected in the setting information 112a. Steps S101 and S102 correspond to the setting step recited in the appended claims.

Next, the head controller 110 communicates with the robot controller 20 to determine whether machining has started (step S103). When machining has started (Yes at step S103), the obtainer 111a obtains the movement direction V of the head 100 (step S104). When the condition at step S103 is not satisfied (No at step S103), the determination processing at step S103 is repeated at predetermined time intervals.

Then, based on the movement direction V obtained at step S104, the adjuster 111b updates the representative direction PV of the radiation locus P made by the head 100 (step S105). This configuration keeps the relative angle between the movement direction V and the representative direction PV constant even when the machining line 200 is curved.

Then, the head controller 110 communicates with the robot controller 20 to determine whether machining has ended (step S106). When machining has ended (Yes at step S106), the entire processing ends. When the condition at step S106 is not satisfied (No at step S106), the procedure at and after step S104 is repeated.

As has been described hereinbefore, the laser machining method uses the head 100 and the robot 10. The head 100 is capable of variably making the shape of the laser radiation locus P. The robot 10 causes the head 100 to move along the machining line 200. The laser machining method includes an obtaining step and an adjusting step. The obtaining step includes obtaining the movement direction V, in which the head 100 is being moved by the robot 10 along the machining line 200. The adjusting step includes adjusting the radiation locus P made by the head 100 to keep a constant relative angle between the movement direction V obtained in the obtaining step and the representative direction PV of the shape of the radiation locus P.

Thus, the laser machining method keeps the representative direction PV of the shape of the radiation locus P constant relative to the movement direction V of the head 100. This configuration maintains machining quality even when the direction of the machining line 200 changes relative to the workpiece W.

As has been described hereinbefore, the head controller 110 controls motions of the head 100, which is capable of variably making the shape of the laser radiation locus P. The head controller 110 includes the obtainer 111a and the adjuster 111b. The obtainer 111a obtains the movement direction V, in which the head 100 is being moved by the robot 10 along the machining line 200. The adjuster 111b adjusts the radiation locus P, which is made by the head 100, to keep a constant relative angle between the movement direction V obtained by the obtainer 111a and the representative direction PV of the shape of the radiation locus P.

Thus, the head controller 110 keeps the representative direction PV of the shape of the radiation locus P constant relative to the movement direction V of the head 100. This configuration maintains machining quality even when the direction of the machining line 200 changes relative to the workpiece W.

As has been described hereinbefore, the robot system 1 includes the head 100, the robot 10, and the head controller 110. The head 100 is capable of variably making the shape of the laser radiation locus P. The robot 10 causes the head 100 to move along the machining line 200. The head controller 110 is a controller that controls motions of the head 100. The head controller 110 includes the obtainer 111a and the adjuster 111b. The obtainer 111a obtains the movement direction V, in which the head 100 is being moved by the robot 10 along the machining line 200. The adjuster 111b adjusts the radiation locus P, which is made by the head 100, to keep a constant relative angle between the movement direction V obtained by the obtainer 111a and the representative direction PV of the shape of the radiation locus P.

Thus, the robot system 1 keeps the representative direction PV of the shape of the radiation locus P constant relative to the movement direction V of the head 100. This configuration maintains machining quality even when the direction of the machining line 200 changes relative to the workpiece W.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A laser machining method, comprising:
   obtaining a movement direction of a head which is being moved by a robot configured to cause the head to move along a machining line;
   setting a shape of a radiation locus for the machining line along which the head is caused to be moved by the robot; and
   moving the head along the machine line while adjusting a radiation locus made by the head based on the movement direction of the head such that the head maintains a same shape of the radiation locus set for the machining line and changes a direction of a representative angle of the same shape of the radiation locus in which the radiation locus is pointed and that a constant relative angle is kept between the movement direction of the head and the direction of the representative angle of the same shape of the radiation locus,
   wherein the head is configured to variably make the shape of the radiation locus using a laser, and the adjusting includes prioritizing a motion of the head to change the direction of the representative angle of the radiation locus over a motion of the robot to change a posture of the head.

2. The laser machining method according to claim 1, wherein the adjusting further comprises adjusting, based on the posture of the head determined by the motion of the robot, the representative angle of the same shape of the radiation locus made by the head.

3. The laser machining method according to claim 2, further comprising:
   setting, in advance, a selected relative angle between the movement direction and the direction of the representative angle,
   wherein the adjusting includes adjusting the radiation locus made by the head such that the constant relative angle is made to correspond to the selected relative angle set in the setting.

4. The laser machining method according to claim 2, wherein the head is mounted on the robot and includes a mirror galvanometer configured to change a direction of laser radiation by the laser.

5. The laser machining method according to claim 1, further comprising:
   setting, in advance, a selected relative angle between the movement direction and the direction of the representative angle,
   wherein the adjusting includes adjusting the radiation locus made by the head such that the constant relative angle is made to correspond to the selected relative angle set in the setting.

6. The laser machining method according to claim 1, wherein the head is mounted on the robot and includes a mirror galvanometer configured to change a direction of laser radiation by the laser.

7. The laser machining method according to claim 6, wherein the adjusting includes controlling the motion of the robot by a robot controller comprising circuitry configured to control the motion of the robot and controlling the motion of the head by a head controller comprising circuitry configured to control the motion of the head based on setting values for the head received through the robot controller.

8. The laser machining method according to claim 1, wherein the adjusting includes controlling the motion of the robot by a robot controller comprising circuitry configured to control the motion of the robot and controlling the motion of the head by a head controller comprising circuitry configured to control the motion of the head based on setting values for the head received through the robot controller.

9. An apparatus, comprising:
   control circuitry configured to control a motion of a head that is configured to variably make a shape of a radiation locus using a laser and set a shape of a radiation locus for a machining line along which the head is caused to be moved by a robot,
   wherein the control circuitry is configured to obtain a movement direction of the head which is being moved by the robot along the machining line, and move the head along the machine line while adjusting the radiation locus made by the head based on the movement direction of the head such that the head maintains a same shape of the radiation locus set for the machining line and changes a direction of a representative angle of the same shape of the radiation locus in which the same shape of the radiation locus is pointed and that a constant relative angle is kept between the movement direction of the head and the direction of the representative angle of the same shape of the radiation locus, and the control circuitry is further configured to prioritize a motion of the head to change the direction of the representative angle of the same shape of the radiation locus over a motion of the robot to change a posture of the head.

10. The apparatus according to claim 9, wherein the control circuitry is further configured to adjust the representative angle of the same shape of the radiation locus made by the head based on the posture of the head determined by the motion of the robot.

11. The apparatus according to claim 10, wherein the control circuitry is further configured to receive a setting, in advance, of a selected relative angle between the movement direction and the direction of the representative angle, and adjust the radiation locus made by the head such that the constant relative angle is made to correspond to the selected relative angle set in the setting.

12. The apparatus according to claim 9, wherein the control circuitry is further configured to receive a setting, in advance, of a selected relative angle between the movement direction and the direction of the representative angle, and adjust the radiation locus made by the head such that the constant relative angle is made to correspond to the selected relative angle set in the setting.

13. The apparatus according to claim 9, wherein the head is mounted on the robot and includes a mirror galvanometer configured to change a direction of laser radiation by the laser.

14. The apparatus according to claim 9, wherein the adjusting includes controlling the motion of the robot by a robot controller comprising circuitry configured to control the motion of the robot and controlling the motion of the head by a head controller comprising the control circuitry configured to control the motion of the head based on setting values for the head received through the robot controller.

15. A robot system, comprising:
a head configured to variably make a shape of a radiation locus using a laser;
a robot configured to cause the head to move along a machining line; and
control circuitry configured to control a motion of the head and set the shape of the radiation locus for the machining line along which the head is caused to be moved by the robot,
wherein the control circuitry is configured to obtain a movement direction of the head which is being moved by the robot along the machining line, and move the head along the machine line while adjusting the radiation locus made by the head based on the movement direction of the head such that the head maintains a same shape of the radiation locus set for the machining line and changes a direction of a representative angle of the same shape of the radiation locus in which the same shape of the radiation locus is pointed and that a constant relative angle is kept between the movement direction of the head and the direction of the representative angle of the same shape of the radiation locus, and the control circuitry is further configured to prioritize a motion of the head to change the direction of the representative angle of the same shape of the radiation locus over a motion of the robot to change a posture of the head.

16. The robot system according to claim 15, wherein the control circuitry is further configured to adjust the representative angle of the same shape of the radiation locus made by the head based on the posture of the head determined by the motion of the robot.

17. The robot system according to claim 16, wherein the control circuitry is further configured to receive a setting, in advance, of a selected relative angle between the movement direction and the direction of the representative angle, and adjust the radiation locus made by the head such that the constant relative angle is made to correspond to the selected relative angle set in the setting.

18. The robot system according to claim 15, wherein the control circuitry is further configured to receive a setting, in advance, of a selected relative angle between the movement direction and the direction of the representative angle, and adjust the radiation locus made by the head such that the constant relative angle is made to correspond to the selected relative angle set in the setting.

19. The robot system according to claim 15, wherein the head is mounted on the robot and includes a mirror galvanometer configured to change a direction of laser radiation by the laser.

20. The robot system according to claim 15, wherein the adjusting includes controlling the motion of the robot by a robot controller comprising circuitry configured to control the motion of the robot and controlling the motion of the head by a head controller comprising the control circuitry configured to control the motion of the head based on setting values for the head received through the robot controller.

* * * * *